(12) United States Patent
Wen et al.

(10) Patent No.: US 9,924,352 B2
(45) Date of Patent: Mar. 20, 2018

(54) VOICE PROMPTING METHOD AND APPARATUS

(71) Applicant: Xiaomi Inc., Beijing (CN)

(72) Inventors: Zhenwei Wen, Beijing (CN); Ruijun Xu, Beijing (CN); Jing Wu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/005,088

(22) Filed: Jan. 25, 2016

(65) Prior Publication Data

US 2016/0219432 A1    Jul. 28, 2016

(30) Foreign Application Priority Data

Jan. 26, 2015  (CN) .......................... 2015 1 0038410

(51) Int. Cl.
| | |
|---|---|
| *H04M 3/16* | (2006.01) |
| *H04W 12/02* | (2009.01) |
| *G06F 3/16* | (2006.01) |
| *H04B 17/318* | (2015.01) |
| *H04B 1/3827* | (2015.01) |
| *H04M 1/57* | (2006.01) |
| *H04W 24/08* | (2009.01) |
| *H04W 88/04* | (2009.01) |

(52) U.S. Cl.
CPC ............ *H04W 12/02* (2013.01); *G06F 3/167* (2013.01); *H04B 1/385* (2013.01); *H04B 17/318* (2015.01); *H04M 1/578* (2013.01); *H04W 24/08* (2013.01); *H04W 88/04* (2013.01)

(58) Field of Classification Search
CPC ..... H04W 12/02; H04W 24/08; H04W 88/04; H04B 17/318; H04B 1/385; H04M 1/578; G06F 3/167
USPC .............................................. 455/411; 3/411
See application file for complete search history.

(56) References Cited

U.S. PATENT DOCUMENTS

| | | | |
|---|---|---|---|
| 5,821,874 | A | 10/1998 | Parvulescu et al. |
| 9,084,013 | B1 * | 7/2015 | Arini ................ H04N 21/44204 |
| 2009/0163190 | A1 | 6/2009 | Helferich |
| 2011/0281550 | A1 | 11/2011 | Peabody |

(Continued)

FOREIGN PATENT DOCUMENTS

| | | |
|---|---|---|
| CN | 1829252 A | 9/2006 |
| CN | 102098628 A | 6/2011 |

(Continued)

OTHER PUBLICATIONS

International Search Report of PCT Application No. PCT/CN2015/093071, dated Jan. 27, 2016, issued by the State Intellectual Property Office of P.R. China as ISA (4 pages).

(Continued)

*Primary Examiner* — Amancio Gonzalez
(74) *Attorney, Agent, or Firm* — Finnegan, Henderson, Farabow, Garrett & Dunner LLP

(57) ABSTRACT

A voice prompting method includes detecting whether an unread communication message is received by an electronic device, acquiring, a signal intensity of a wearable device coupled with the electronic device if the unread communication message is received, and performing voice prompt for the unread communication message according to a prompting manner corresponding to the signal intensity.

9 Claims, 7 Drawing Sheets

300A

Detect whether unread communication message is received — 301

Acquire signal intensity of wearable device coupled with electronic device, if it is detected that unread communication message is received — 302

When signal intensity is lower than first intensity threshold, forbid voice prompt or perform voice prompt on unread communication message in prompting manner that shields privacy information — 303

When signal intensity equals or is greater than first intensity threshold but lower than second intensity threshold, perform voice prompt for unread communication message in prompting manner that prompts brief information — 304

When signal intensity equals or is greater than second intensity threshold, perform voice prompt on unread communication message in prompting manner that prompts complete information — 305

(56) References Cited

U.S. PATENT DOCUMENTS

| | | | |
|---|---|---|---|
| 2013/0148791 A1 | 6/2013 | Earnshaw et al. | |
| 2014/0344375 A1 | 11/2014 | Hauser et al. | |
| 2016/0174025 A1* | 6/2016 | Chaudhri | H04W 4/02 455/41.1 |

FOREIGN PATENT DOCUMENTS

| | | |
|---|---|---|
| CN | 102170497 A | 8/2011 |
| CN | 103024172 A | 4/2013 |
| CN | 103220395 A | 7/2013 |
| CN | 203327110 U | 12/2013 |
| CN | 103813453 A | 5/2014 |
| CN | 103942021 A | 7/2014 |
| CN | 104065818 A | 9/2014 |
| CN | 104104801 A | 9/2014 |
| CN | 104243662 A | 12/2014 |
| CN | 104639745 A | 5/2015 |
| JP | 2003016012 A | 1/2003 |
| JP | 2005341187 A | 12/2005 |
| JP | 2006128783 A | 5/2006 |
| JP | 2006-295554 A | 10/2006 |
| JP | 2007180804 A | 7/2007 |
| JP | 2008124959 A | 5/2008 |
| JP | 2008167424 A | 7/2008 |
| JP | 2013187622 A | 9/2013 |
| KR | 20040028172 A | 4/2004 |
| KR | 20110019189 A | 2/2011 |
| RU | 2146428 C1 | 3/2000 |
| WO | WO 2004/107789 A1 | 12/2004 |
| WO | WO 2007/004352 A1 | 1/2007 |
| WO | WO 2007/074596 A1 | 7/2007 |
| WO | WO 2014/143997 A1 | 9/2014 |

OTHER PUBLICATIONS

Extended Search Report for European Application No. 16152473.1 from the European Patent Office, dated Jun. 1, 2016.
English version of International Search Report of PCT Application No. PCT/CN2015/093071, dated Jan. 27, 2016, issued by the State Intellectual Property Office of P.R. China as ISA.
Notification on Results of Patentability Check of Invention for Russian Application No. 2016101218/08(001640), dated Feb. 9, 2017.

* cited by examiner

VOICE PROMPTING METHOD AND APPARATUS

CROSS-REFERENCE TO RELATED APPLICATION

This application is based upon and claims priority to Chinese Patent Application No. 201510038410.X, filed on Jan. 26, 2015, the entire contents of which are incorporated herein by reference.

TECHNICAL FIELD

The present disclosure relates to computer technology and, more particularly, to a voice prompting method and a voice prompting apparatus.

BACKGROUND

A voice prompting function can directly notify a user of relevant information by voice, eliminating the need for the user to manually check his/her smart phone. Therefore, the voice prompting function has become one of standard functions of a smart phone.

To use the voice prompting function to perform voice prompt for unread communication messages, the user can enable the voice prompting function of a smart phone, and set a prompting manner. Upon receiving an unread communication message, the smart phone can perform voice prompt on detailed contents of the received unread communication message in the set prompting manner. As such, the user can learn the detailed contents of the unread communication message from the voice prompt when it is inconvenient for the user to view the screen of the smart phone.

SUMMARY

In accordance with the present disclosure, there is provided a voice prompting method. The method includes detecting whether an unread communication message is received by an electronic device, acquiring, a signal intensity of a wearable device coupled with the electronic device if the unread communication message is received, and performing voice prompt for the unread communication message according to a prompting manner corresponding to the signal intensity.

Also in accordance with the present disclosure, there is provided a voice prompting apparatus. The apparatus includes one or more processors and a memory storing instructions that, when executed by the one or more processors, cause the one or more processors to detect whether an unread communication message is received by an electronic device, acquire a signal intensity of a wearable device coupled with the electronic device if the unread communication message is received, and perform voice prompt for the unread communication message according to a prompting manner corresponding to the signal intensity.

Also in accordance with the present disclosure, there is provided a non-transitory computer-readable storage medium having stored therein instructions that, when executed by one or more processors of an apparatus, cause the apparatus to detect whether an unread communication message is received by an electronic device, acquire a signal intensity of a wearable device coupled with the electronic device if the unread communication message is received, and perform voice prompt for the unread communication message according to a prompting manner corresponding to the signal intensity.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
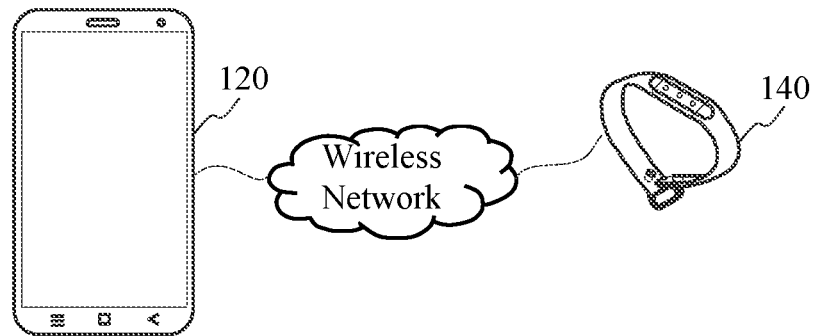
FIG. 1 is a diagram illustrating an implementing environment relating to voice prompting methods according to some exemplary embodiments.

FIG. 1 is a diagram illustrating an implementing environment relating to voice prompting methods according to exemplary embodiments. As shown in FIG. 1, the implementing environment includes an electronic device 120 and a wearable device 140. The electronic device 120 may be an electronic device that has a voice prompting function, such as a smart phone, a tablet computer, a smart television, an e-book reader, an multimedia player, a portable laptop computer, a desktop computer, or the like. The wearable device 140 may be a wearable device capable of broadcasting signals, such as a smart bracelet, a smart watch, or smart glasses. As shown in FIG. 1, the electronic device 120 and the wearable device 140 are coupled to each other via a wireless network, such as a network based on low-power Bluetooth or Wireless-Fidelity (Wi-Fi) technology.

Figure 2:
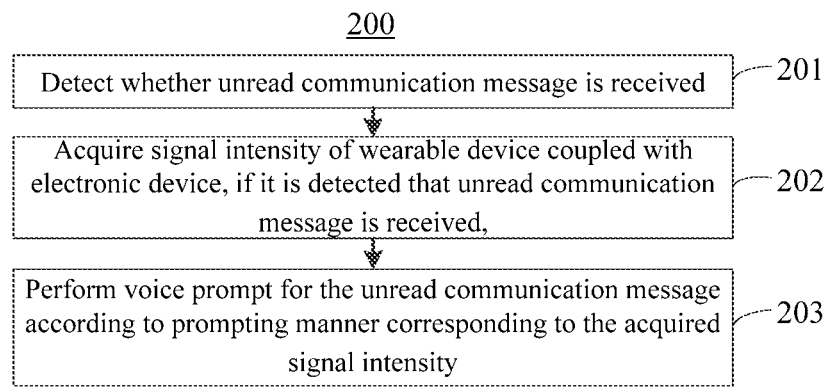
FIG. 2 is a flowchart illustrating a voice prompting method according to an exemplary embodiment.

FIG. 2 is a flowchart illustrating a voice prompting method 200 according to an exemplary embodiment. The voice prompting method 200 can be implemented, for example, in the electronic device 120. As shown in FIG. 2, at 201, it is detected whether an unread communication message is received. At 202, if it is detected that an unread communication message is received, a signal intensity of the wearable device 140 that is coupled with the electronic device 120 is acquired. At 203, voice prompt for the unread communication message is performed according to a prompting manner corresponding to the signal intensity.

Figure 3A:
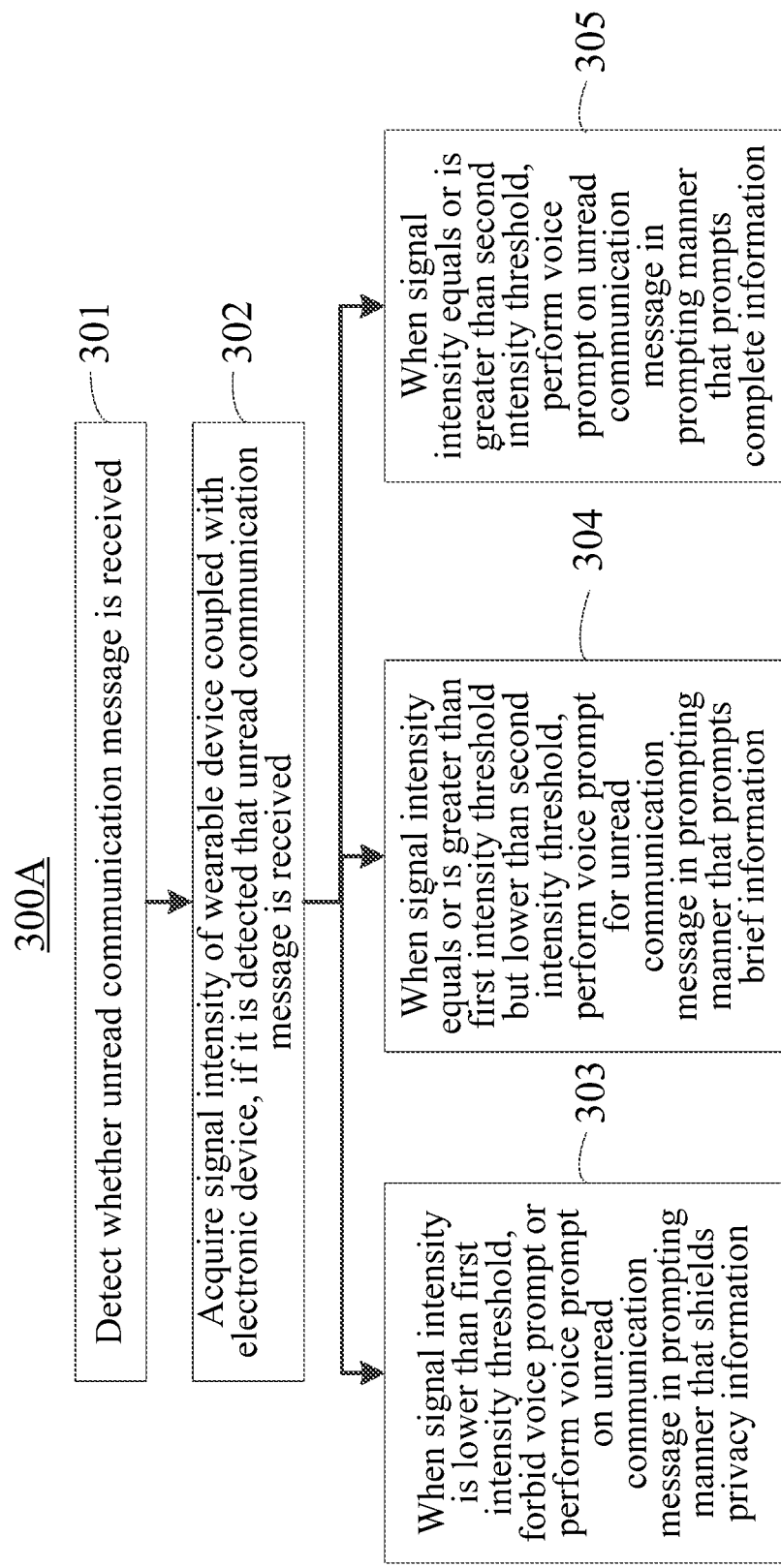
FIG. 3A is a flowchart illustrating a voice prompting method according to another exemplary embodiment.

FIG. 3A is a flowchart illustrating a voice prompting method 300A according to another exemplary embodiment. The voice prompting method 300A can be implemented, for example, in the electronic device 120. As shown in FIG. 3A, at 301, it is detected whether an unread communication message is received. The unread communication message can be a short message, a voice communication message, an instant communication message, a push message, a reminder message, a multimedia communication message, an email, or the like that has not been read or viewed by a user of the electronic device 120.

In some embodiments, the user may set a particular type, which is referred to herein as a "to-prompt type," of unread communication messages for which the voice prompt is to be performed. According to the user's setting, the electronic device 120 may detect whether an unread communication message of the particular type is received. The to-prompt type may include one or more of short message, voice communication message, instant communication message, push message, reminder message, multimedia communication message, email, or the like.

For example, the user may only set the short message as the to-prompt type, and the electronic device 120 may only detect whether a short message is received. As another example, the user may set the short message and the voice communication message as the to-prompt type, and the electronic device 120 may detect whether a short message or a voice communication message is received. As another example, the user may set the short message and the instant communication message as the to-prompt type, and the electronic device 120 may detect whether a short message or an instant communication message is received. As another example, the user may set the short message, the voice communication message, and the instant communication message as the to-prompt type, and the electronic device 120 may detect whether a short message, a voice communication message, or an instant communication message is received.

At 302, if it is detected that an unread communication message is received, a signal intensity of the wearable device 140 that is coupled with the electronic device 120 is acquired. That is, upon receiving an unread communication message, the electronic device 120 determines the signal intensity of the wearable device 140 through a broadcast signal broadcasted by the wearable device 140. The electronic device 120 can determine the signal intensity of the wearable device 140 according to various approaches, as discussed below.

For example, in one approach, a broadcast signal intensity of the broadcast signal acquired by the electronic device 140 is obtained, and the obtained broadcast signal intensity is determined as the signal intensity of the wearable device 140. That is, after acquiring the broadcast signal, the electronic device 120 directly determines the broadcast signal intensity of the broadcast signal as the signal intensity of the wearable device 140. This approach has a better real-time performance.

In another approach, at least two broadcast signals broadcasted by the wearable device 140 are acquired, an average value of broadcast signal intensities of the acquired at least two signals is calculated, and the calculated average value is determined as the signal intensity of the wearable device. That is, after acquiring at least two, i.e., a plurality, of broadcast signals, the electronic device 120 calculates the average value of the broadcast signal intensities of these broadcast signals, and determines the calculated average value as the signal intensity of the wearable device 140. This approach has a better accuracy. In some embodiments, the electronic device 120 acquires the plurality of broadcast signals in a short period of time, e.g., one or two seconds, so as to avoid poor timeliness of the voice prompt due to a longer time period for acquiring the broadcast signals. For example, within two seconds after receiving an unread communication message, the electronic device 120 acquires three broadcast signals broadcasted by the wearable device 140, and obtains the broadcast signal intensities corresponding to the three broadcast signals. A broadcast signal intensity can be represented as a percentage value of the strongest signal intensity broadcasted by the wearable device 140, using a received signal strength indication (RSSI), or according to another suitable method. For example, the broadcast signal intensities are 55%, 62%, and 57%, respectively. The average value of the broadcast signal intensities is 58%, and thus the electronic device 120 determines 58% as the signal intensity of the wearable device 140. It should be noted that a percentage value is adopted herein to denote the signal intensity.

Since the wearable device 140 is usually worn by the user, the distance from the wearable device 140 to the electronic device 120 can be used to represent the distance from the user to the electronic device 120. The signal intensity of the wearable device 140 is usually in positive correlation to the distance from the wearable device 140 to the electronic device 120, and thus can be used to represent the distance from the wearable device 140 to the electronic device 120 and hence the distance from the user to the electronic device 120.

According to the present disclosure, the signal intensity of the wearable device 140 can be used to determine a prompting manner, according to which a voice prompt is performed for the unread communication message in the electronic device 120. In some embodiments, after acquiring the signal intensity of the wearable device 140, the electronic device 120 performs the voice prompt for the unread communication message according to a magnitude of the acquired signal intensity as compared to a first intensity threshold and a second intensity threshold, as discussed below. The first intensity threshold is lower than the second intensity threshold.

At 303, when the signal intensity is lower than the first intensity threshold, the voice prompt is forbidden or is performed in a prompting manner that shields privacy information. The privacy information includes at least sender information and contents of the unread communication message. That is, after acquiring the signal intensity of the wearable device 140, the electronic device 120 judges whether the signal intensity is lower than the first intensity threshold. If the signal intensity is lower than the first intensity threshold, it means that the user is remote from the electronic device 120 or there are a lot of obstacles between the user and the electronic device 120. In order to protect the user's privacy and prevent privacy leakage due to the voice prompt, in some embodiments, the electronic device 120 does not perform voice prompt for the unread communication message. In other embodiments, the electronic device 120 performs the voice prompt in a prompting manner that shields privacy information. For example, the voice prompt does not include the sender information and the contents of the unread communication message, but only includes an indication that the unread communication message is received.

Figure 3B:
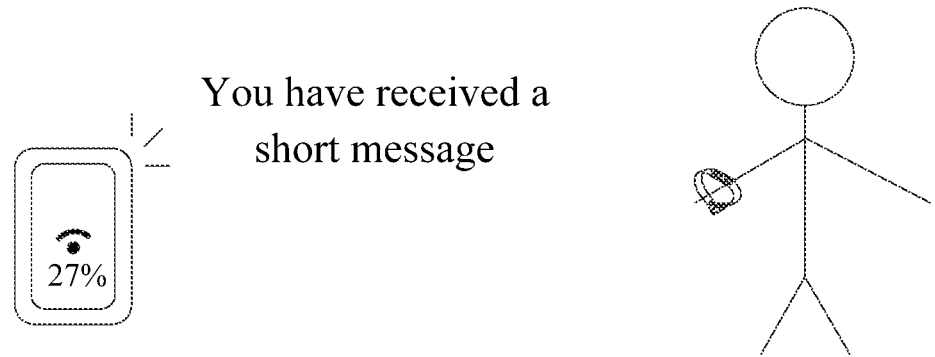
FIG. 3B is a diagram illustrating a voice prompt according to an exemplary embodiment.

FIG. 3B is a diagram illustrating a voice prompt according to an exemplary embodiment. It is assumed that the first intensity threshold is 30%. As shown in FIG. 3B, the signal intensity of the wearable device 140 is 27%, which is lower than the first intensity threshold 30%. In this scenario, the electronic device 120 prompts the user that: "You have received a short message." This voice prompt does not include the sender information and the contents of the short message, but merely informs the user that there is a short message.

Referring again to FIG. 3A, at 304, when the signal intensity equals or is greater than the first intensity threshold but is lower than the second intensity threshold, the voice prompt is performed in a prompting manner that prompts brief information. The brief information includes at least the sender information of the unread communication message. That is, after acquiring the signal intensity of the wearable device 140 that equals or is greater than the first intensity threshold, the electronic device 120 judges whether the signal intensity is lower than the second intensity threshold. If the signal intensity is lower than the second intensity threshold, the electronic device 120 performs the voice prompt in a prompting manner that prompts the brief information. For example, only the sender information of the unread communication message is prompted. The sender information may be a telephone number, a nickname, a name, etc., of the person sending the unread communication message. For example, when the received unread communication message is a short message or a voice communication message, the electronic device 120 can extract the sender's telephone number and search in a contact book stored in the electronic device 120 to determine whether there is a name corresponding to the sender's telephone number. If there is a name corresponding to the sender's telephone number in the contact book, the located name is determined as the sender information of the unread communication message. If there is no name corresponding to the sender's telephone number in the contact book, the telephone number of the sender is determined as the sender information of the unread communication message. As another example, when the received unread communication message is an instant communication message, the electronic device 120 can extract the sender's telephone number and search in a contact book of an instant communication program activated by the electronic device 120 to determine whether there is a name or nickname corresponding to the sender's telephone number. If there is a name or nickname corresponding to the sender's telephone number in the contact book, the located name or nickname is determined as the sender information of the unread communication message. If there is no name or nickname corresponding to the sender's telephone number in the contact book, the telephone number of the sender is determined as the sender information of the unread communication message. After the sender information is determined, the voice prompt is performed based on the determined sender information.

Figure 3C:
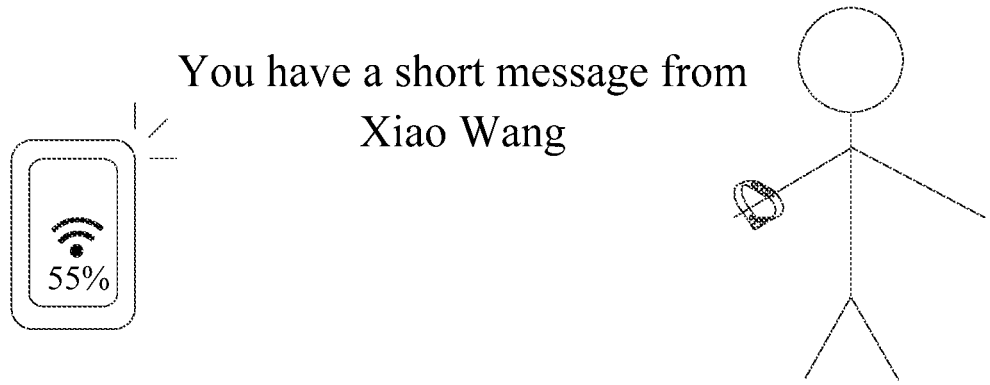
FIG. 3C is a diagram illustrating a voice prompt according to another exemplary embodiment.

FIG. 3C is a diagram illustrating a voice prompt according to another exemplary embodiment. It is assumed that the first intensity threshold is 30% and the second intensity threshold is 60%. As shown in FIG. 3C, the signal intensity of the wearable device 140 is 55%, which is greater than the first intensity threshold 30% and lower than the second intensity threshold 60%. In this scenario, the electronic device 120 prompts brief information: "You have a short message from Xiao Wang." This voice prompt merely includes sender information and a type of the unread communication message, allowing the user to generally know about relevant information of the unread communication message, which is convenient for the user to determine, based on the obtained relevant information, whether to view the unread communication message immediately.

Referring again to FIG. 3A, at 305, when the signal intensity equals or is greater than the second intensity threshold, the voice prompt is performed in a prompting manner that prompts complete information. That is, after acquiring the signal intensity of the wearable device 140 that is greater than the second intensity threshold, the electronic device 120 performs the voice prompt in a prompting manner that prompts the complete information. That is, the electronic device 120 may voice-broadcast the sender information and the contents of the unread communication message.

Figure 3D:
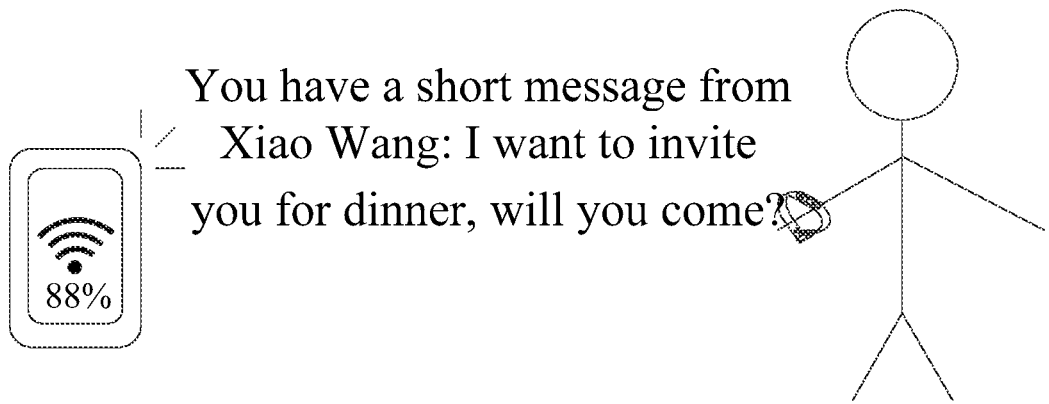
FIG. 3D is a diagram illustrating a voice prompt according to another exemplary embodiment.

FIG. 3D is a diagram illustrating a voice prompt according to another exemplary embodiment. It is assumed that the second intensity threshold is 60%. As shown in FIG. 3D, the signal intensity of the wearable device 140 is 88%, which is greater than the second intensity threshold 60%. In this scenario, the electronic device 120 prompts the complete information: "You have a short message from Xiao Wang: I want to invite you for dinner, will you come?" This voice prompt includes all contents of the unread communication message, so that the user can acquire all contents of the unread communication message without any operation, improving the efficiency for acquiring the unread communication message when it is inconvenient for the user to view the screen of the electronic device 120.

The prompting manners corresponding to the signal intensity of the wearable device 140 acquired by the electronic device 140 are not limited to the manners described above. The prompting manner can be set by the user based on his/her own needs. For example, the prompting manners corresponding to respective signal intensities may all be set as performing voice prompt for the unread communication message in a prompting manner that prompts the complete information or the brief information, or in a prompting manner that shields privacy information, or set as forbidding voice prompt. Alternatively, the prompting manners can be set as performing voice prompt in a prompting manner that shields privacy information if the signal intensity of the wearable device 140 is lower than the second intensity threshold, and performing voice prompt in a prompting manner that prompts complete information if the signal intensity of the wearable device 140 equals or is greater than the second intensity threshold. Alternatively, the prompting manners can be set as forbidding voice prompt if the signal intensity of the wearable device 140 is lower than the first intensity threshold, and performing voice prompt in a prompting manner that prompts brief information if the signal intensity of the wearable device 140 equals or is greater than the first intensity threshold.

In some embodiments, different prompting manners can be set for different types of unread communication messages. For example, for short messages, the prompting manners can be set as performing voice prompt in a prompting manner that shields privacy information if the signal intensity of the wearable device 140 is lower than the second intensity threshold, and performing voice prompt in a prompting manner that prompts complete information if the signal intensity of the wearable device 140 equals or is greater than the second intensity threshold. For voice communication messages, the prompting manners can be set as forbidding performing voice prompt if the signal intensity of the wearable device 140 is lower than the first intensity threshold, and performing voice prompt in a prompting manner that prompts brief information if the signal intensity of the wearable device 140 equals or is greater than the first intensity threshold. For instant communication messages, the prompting manners can be set as performing voice prompt in a prompting manner that shields privacy information if the signal intensity of the wearable device 140 is lower than the first intensity threshold, and performing voice prompt in a prompting manner that prompts brief information.

In some circumstances, when the electronic device is performing a voice prompt for an unread communication message, the user may be walking and may not carry the electronic device 120. That is, the distance between the wearable device 140 worn by the user and the electronic device 120 is changing. In this scenario, the electronic device 120 needs to detect the signal intensity of the wearable device 140 in real time. When the signal intensity is too low, the voice prompt is interrupted, to prevent leakage of the user's information, as described below.

Figure 3E:
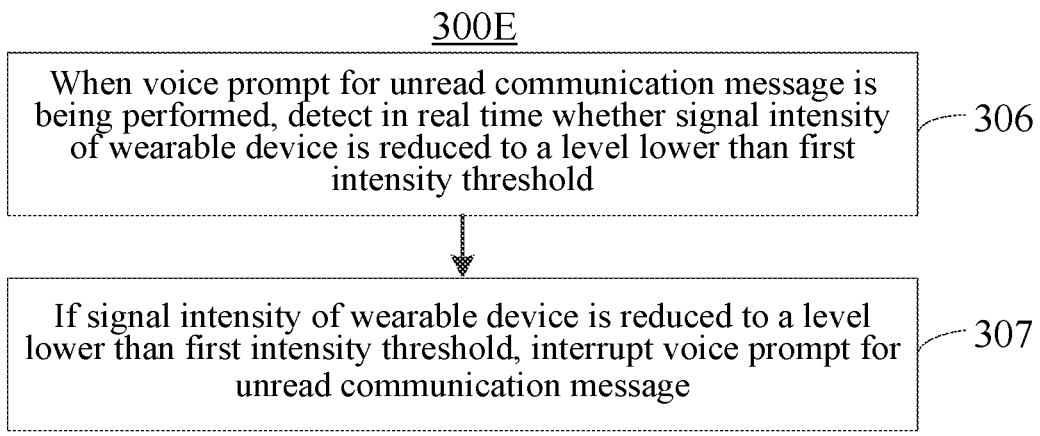
FIG. 3E is a flowchart illustrating a method for interrupting voice prompt according to an exemplary embodiment.

FIG. 3E is a flowchart illustrating a method 300E for interrupting a voice prompt according to an exemplary embodiment. The method 300E can be implemented, for example, in the electronic device 120 to interrupt a voice prompt that the electronic device 120 is performing. As shown in FIG. 3E, at 306, when the electronic device 120 is performing the voice prompt on an unread communication message, the electronic device 120 detects in real time whether the signal intensity of the wearable device 140 that is coupled with the electronic device 120 is reduced to a level lower than the first intensity threshold. That is, the electronic device 120 receives the broadcast signal broadcasted by the wearable device 140 in real time, determines the signal intensity of the wearable device 140 according to the broadcast signal, and detects whether the signal intensity is reduced to a level lower than the first intensity threshold.

At 307, if the signal intensity of the wearable device 140 being received by the electronic device 120 in real time is reduced to a level lower than the first intensity threshold, the voice prompt for the unread communication message is interrupted. That is, when it is detected that the signal intensity of the wearable device 140 being received by the electronic device 120 in real time is reduced to a level lower than the first intensity threshold, it indicates that the user is currently remote from the electronic device 120. In this scenario, the electronic device 120 interrupts the voice prompt on the unread communication message, to prevent leakage of the user's information.

In some circumstances, when the electronic device 120 performs a voice prompt on an unread communication message, the user may be too far away from the electronic device 120 and thus does not hear the voice prompt. In this scenario, when the user gets close to the electronic device 120, the electronic device 120 may re-perform the voice prompt, as described below.

Figure 3F:
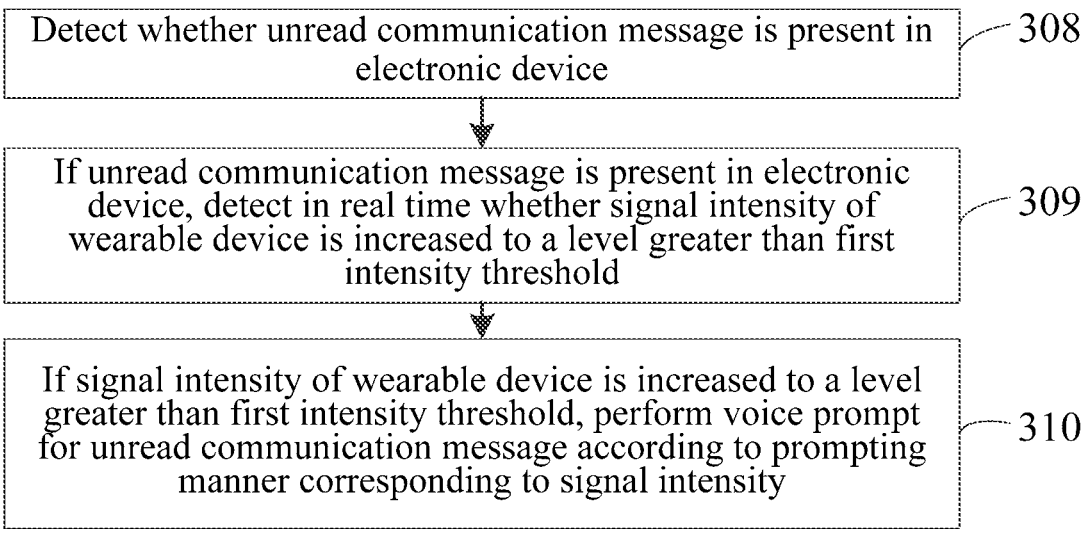
FIG. 3F is a flowchart illustrating a method for re-performing voice prompt according to an exemplary embodiment.

FIG. 3F is a flowchart illustrating a method 300F for re-performing a voice prompt according to an exemplary embodiment. The method 300F can be implemented, for example, in the electronic device 120 to re-perform a voice prompt that was performed before. As shown in FIG. 3F, at 308, it is detected whether an unread communication message is present in the electronic device 120. The unread communication message herein may be a short message, a voice communication message, an instant communication message, or the like, that has not been read or viewed by the user. More specifically, the unread communication message may be an unread communication message that has not been viewed by the user after a voice prompt is performed by the electronic device 120, may be an unread communication message that is received when the electronic device 120 is remote from the user so that the electronic device 120 does not perform a voice prompt for the unread communication message, and has not been viewed by the user, or may be an unread communication message for which a voice prompt is interrupted because the user moves away from the electronic device 120 when the electronic device 120 is performing a voice prompt, and which has not been viewed by the user.

At 309, if an unread communication message is present in the electronic device 120, the electronic device 120 detects in real time whether the signal intensity of the wearable device 140 that is coupled with the electronic device 120 is increased to a level greater than the first intensity threshold.

In some embodiments, to avoid user disturbance by too many voice prompts for the same unread communication message, the user can control, by setting a predefined prompt number threshold, the number of times that a voice prompt can be performed for the same unread communication message. This number of times is also referred to herein as a "prompt number." After detecting that an unread communication message is present, the electronic device 120 can detect whether the prompt number reaches the predefined prompt number threshold. If it is detected that the prompt number reaches the predefined prompt number threshold, re-performing voice prompt for the unread communication message can be stopped. For example, the predefined prompt number threshold is set to be three. After detecting that voice prompt for the same unread communication message has been performed three times, the electronic device 120 stops re-performing voice prompt for the unread communication message, to avoid disturbing the user. In some embodiments, the user may set different predefined prompt number thresholds for different types of unread communication messages, to satisfy the user's corresponding requirements.

In some embodiments, when it is detected that the prompt number has not reached the predefined prompt number threshold, the electronic device 120 detects in real time whether the signal intensity of the wearable device 140 is increased to a level greater than the first intensity threshold.

At 310, if the signal intensity of the wearable device 140 is increased to a level greater than the first intensity threshold, voice prompt is performed for the unread communication message according to the prompting manner corresponding to the signal intensity. That is, when it is detected that the signal intensity of the wearable device 140 is increased to a level greater than the first intensity threshold, it indicates that the user is moving closer to the electronic device 120. At this time, because the user has not viewed the unread communication message, in order to ensure the user views the unread communication message in time to avoid missing important messages, the electronic device 120 may re-perform a voice prompt for the unread communication message according to the prompting manner corresponding to the detected signal intensity.

Exemplary apparatus consistent with the present disclosure are described below, which can be used to perform a method consistent with the present disclosure. Details of the operation of the exemplary apparatus are similar to the exemplary methods described above, and thus are omitted here.

Figure 4:
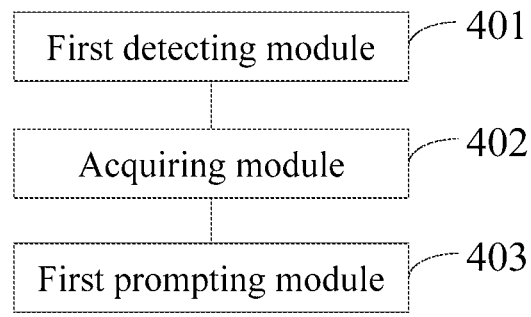
FIG. 4 is a block diagram illustrating a voice prompting apparatus according to an exemplary embodiment.

FIG. 4 is a block diagram illustrating a voice prompting apparatus 400 according to an exemplary embodiment. The voice prompting apparatus 400 can be implemented, for example, in the electronic device 120. As shown in FIG. 4, the voice prompting apparatus includes a first detecting module 401, an acquiring module 402, and a first prompting module 403. The first detecting module 401 is configured to detect whether an unread communication message is received. The acquiring module 402 is configured to, when the first detecting module 401 detects that an unread communication message is received, acquire a signal intensity of the wearable device 140 that is coupled with the electronic device 120. The first prompting module 403 is configured to perform voice prompt for the unread communication message according to a prompting manner corresponding to the signal intensity acquired by the acquiring module 402.

Figure 5:
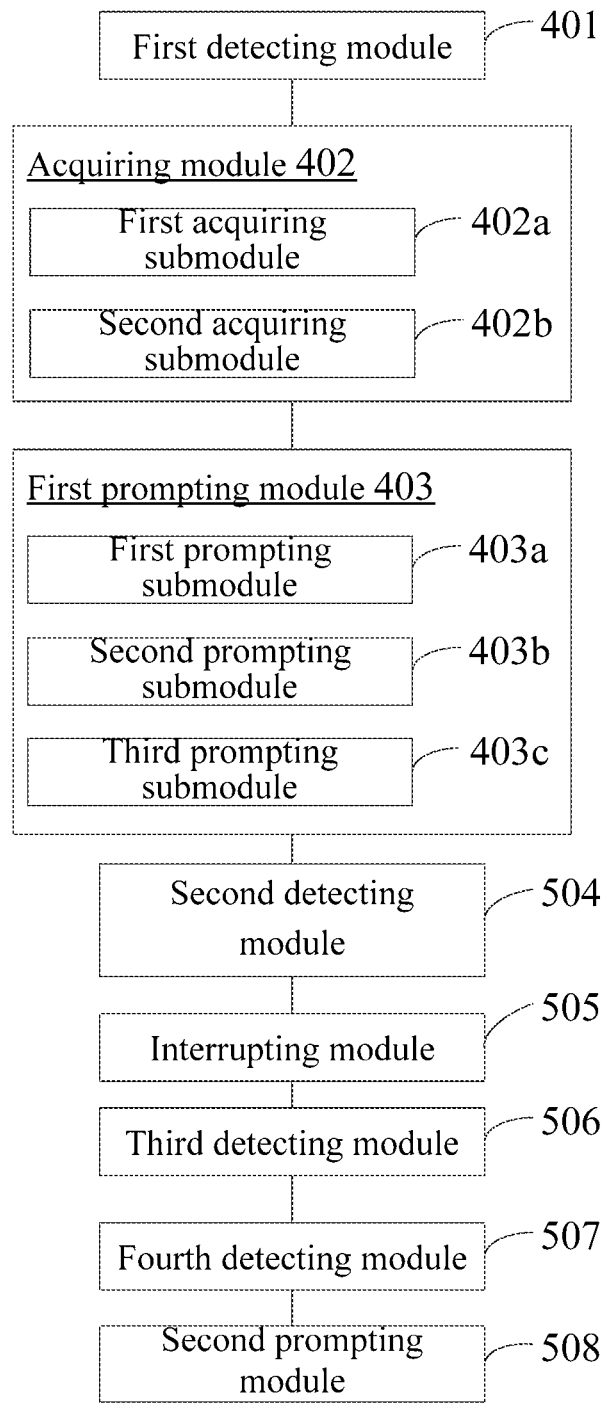
FIG. 5 is a block diagram illustrating a voice prompting apparatus according to another exemplary embodiment.

FIG. 5 is a block diagram illustrating a voice prompting apparatus 500 according to another exemplary embodiment. The voice prompting apparatus 500 can be implemented, for example, in the electronic device 120. As shown in FIG. 5, the voice prompting apparatus 500 includes the first detecting module 401, the acquiring module 402, and the first prompting module 403.

In some embodiments, as shown in FIG. 5, the first prompting module 403 includes a first prompting submodule 403a, a second prompting submodule 403b, and a third prompting submodule 403c. The first prompting submodule 403a is configured to, when the signal intensity of the wearable device 140 is lower than a first intensity threshold, forbid voice prompt or to perform voice prompt for the unread communication message in a prompting manner that shields privacy information. The privacy information includes at least sender information and contents of the unread communication message. The second prompting submodule 403b is configured to, when the signal intensity equals or is greater than the first intensity threshold but lower than a second intensity threshold, perform voice prompt for the unread communication message in a prompting manner that prompts brief information. The brief information includes at least the sender information of the unread communication message. The third prompting submodule 403c is configured to, when the signal intensity equals or is greater than the second intensity threshold, perform voice prompt for the unread communication message in a prompting manner that prompts complete information of the unread communication message.

In some embodiments, as shown in FIG. 5, the voice prompting apparatus 500 further includes a second detecting module 504 and an interrupting module 505. The second detecting module 504 is configured to, when the voice prompt for the unread communication message is being performed, detect in real time whether the signal intensity of the wearable device 140 is reduced to a level lower than the first intensity threshold. The interrupting module 505 is configured to, when the second detecting module 504 detects that the signal intensity of the wearable device 140 is reduced to a level lower than the first intensity threshold, interrupt the voice prompt for the unread communication message.

As shown in FIG. 5, the voice prompting apparatus 500 further includes a third detecting module 506, a fourth detecting module 507, and a second prompting module 508. The third detecting module 506 is configured to detect whether an unread communication message is present in the electronic device 120. The fourth detecting module 507 is configured to, when the third detecting module 506 detects that an unread communication message is present in the electronic device, detect in real time whether the signal intensity of the wearable device 140 is increased to a level greater than the first intensity threshold. The second prompting module 508 is configured to, when the fourth detecting module 507 detects that the signal intensity of the wearable device 140 is increased to a level greater than the first intensity threshold, perform voice prompt for the unread communication message according to the prompting manner corresponding to the signal intensity.

In some embodiments, as shown in FIG. 5, the acquiring module 402 includes a first acquiring submodule 402a and a second acquiring submodule 402b. The first acquiring submodule 402a is configured to acquire a broadcast signal broadcasted by the wearable device 140, obtain a broadcast signal intensity of the broadcast signal, and determine the obtained broadcast signal intensity as the signal intensity of the wearable device 140. The second acquiring submodule 402b is configured to acquire at least two broadcast signals broadcasted by the wearable device 140, calculate an average value of broadcast signal intensities of the acquired at least two broadcast signals, and determine the obtained average value as the signal intensity of the wearable device 140.

In accordance with the present disclosure, there is provided a voice prompting apparatus including a processor and a memory storing instructions executable by the processor. The instructions, when executed by the processor, cause the processor to perform a method consistent with the embodiments of the present disclosure, such as one of the exemplary methods described above.

Figure 6:
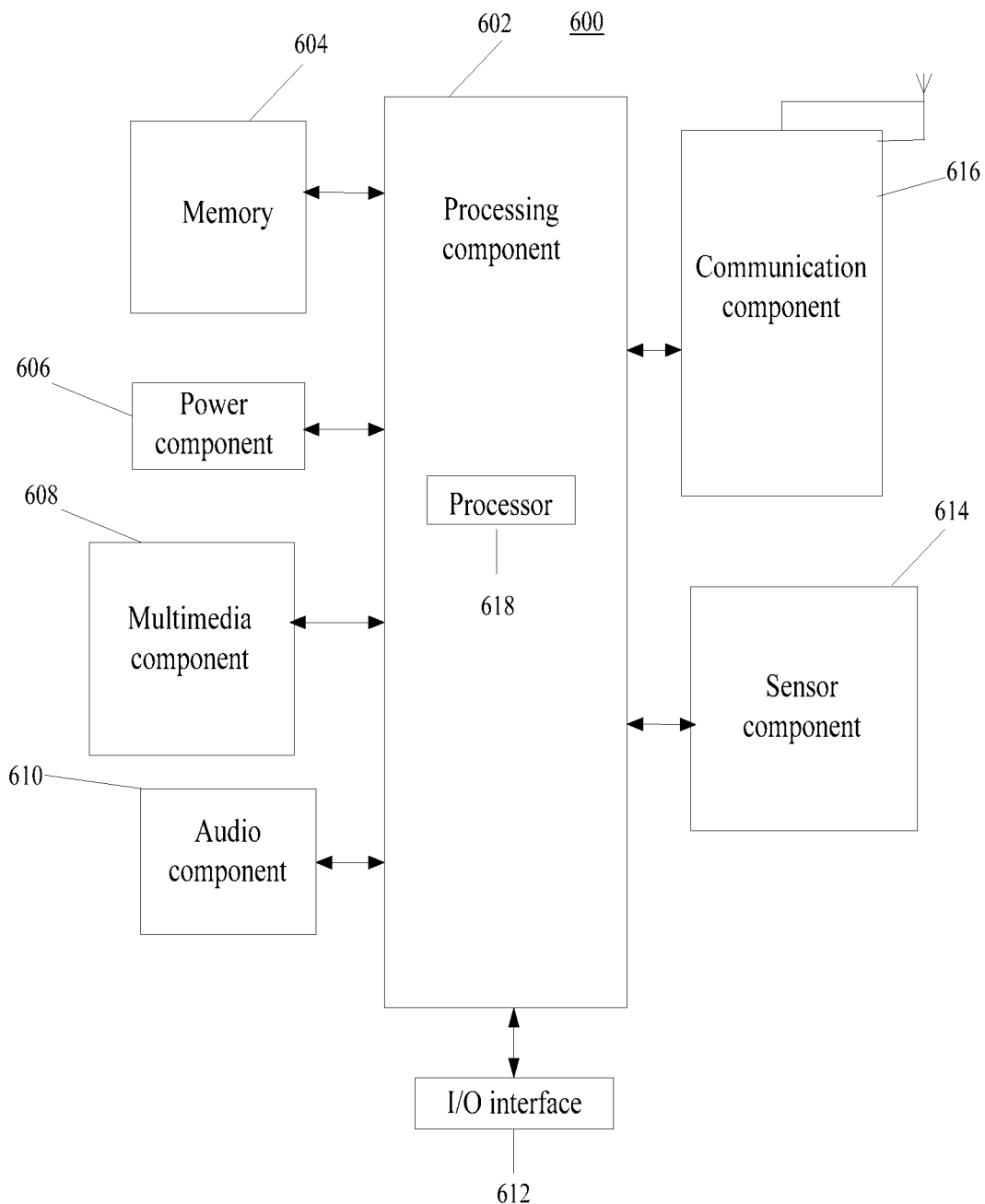
FIG. 6 is a block diagram illustrating an apparatus adapted for voice prompting according to an exemplary embodiment.

FIG. 6 is a block diagram illustrating an voice prompting apparatus 600 according to an exemplary embodiment. For example, the apparatus 600 may be a mobile phone, a computer, a digital broadcast terminal, a messaging device, a gaming console, a tablet, a personal digital assistant, or the like, that has a voice playing function.

Referring to FIG. 6, the apparatus 600 includes one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the apparatus 600, such as the operations associated with display, telephone calls, data communications, camera operations, and recording operations. The processing component 602 may include one or more processors 618 to execute instructions to perform all or a part of the steps in the above-described methods. In addition, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operations of the apparatus 600. Examples of such data include instructions for any application or method operated on the apparatus 600, contact data, phonebook data, messages, pictures, videos, and the like. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power component 606 provides power to various components of the apparatus 600. The power component 606 may include a power management system, one or more power supplies, and other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive external multimedia data while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the apparatus 600 is in an operation mode, such as a call mode, a recording mode, or a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and a peripheral interface module, such as a keyboard, a click wheel, a button, or the like. The buttons may include, but are not limited to, a home button, a volume button, a starting button, and a locking button.

The sensor component 614 includes one or more sensors to provide status assessments of various aspects of the apparatus 600. For example, the sensor component 614 may detect an open/closed status of the apparatus 600, relative positioning of components, e.g., the display and the keypad, of the apparatus 600, a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communications, wired or wirelessly, between the apparatus 600 and other devices. The apparatus 600 may access a wireless network based on a communication standard, such as WiFi, 2G, 3G, or 4G, or a combination thereof. In one exemplary embodiment, the communication component 616 receives a broadcast signal or broadcast associated notification information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, and other technologies.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described voice prompting methods.

In exemplary embodiments, there is also provided a non-transitory computer-readable storage medium including instructions, such as included in the memory 604, executable by the processor 618 in the apparatus 600, for performing a method consistent with the present disclosure, such as one of the above-described voice prompting methods. For example, the non-transitory computer-readable storage medium may be a ROM, a random access memory (RAM), a compact disc read-only memory (CD-ROM), a magnetic tape, a floppy disc, an optical data storage device, or the like.

According to the present disclosure, a voice prompt is performed on an electronic device for an unread communication message according to a prompting manner corresponding to a signal intensity of a wearable device coupled with the electronic device. The signal intensity of the wearable device usually indicates a distance from the user to the electronic device. Thus, when the user is located remotely from the electronic device, the voice prompt can be performed in a safer voice prompting manner. Moreover, while a voice prompt is being performed, if the signal intensity of the wearable device is reduced to a certain level, the voice prompt is interrupted. Accordingly, the user privacy is better protected and the security of the user information is enhanced. Further, according to the present disclosure, voice prompt can be re-performed when the user moves closer to the electronic device. Thus the effect of the voice prompt can be improved.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the invention is only defined by the appended claims.

The invention claimed is:

1. A voice prompting method, comprising:
    detecting whether an unread communication message is received by an electronic device;
    acquiring, if the unread communication message is received, a signal intensity of a wearable device coupled with the electronic device; and
    performing voice prompt for the unread communication message according to a prompting manner corresponding to the signal intensity;
    wherein performing the voice prompt for the unread communication message includes:
    forbidding the voice prompt or performing the voice prompt in a prompting manner that shields privacy information if the signal intensity of the wearable device is lower than a first intensity threshold, the privacy information including at least sender information and contents of the unread communication message;
    performing the voice prompt in a prompting manner that prompts brief information if the signal intensity of the wearable device equals or is greater than the first intensity threshold but is lower than a second intensity threshold, the brief information including at least the sender information of the unread communication message; and
    performing the voice prompt in a prompting manner that prompts complete information if the signal intensity of the wearable device equals or is greater than the second intensity threshold.

2. The method according to claim 1, further comprising:
    detecting, when the voice prompt is being performed, in real time whether the signal intensity of the wearable device is reduced to a level lower than the first intensity threshold; and
    interrupting, if the signal intensity of the wearable device is reduced to a level lower than the first intensity threshold, the voice prompt.

3. The method according to claim 1, further comprising:
    detecting whether the unread communication message is present in the electronic device;
    detecting, if the unread communication message is present in the electronic device, in real time whether the signal intensity of the wearable device is at a level equal to or greater than the first intensity threshold; and
    performing, if the signal intensity of the wearable device is increased to a level greater than the first intensity threshold, the voice prompt according to the prompting manner corresponding to the signal intensity.

4. The method according claim 1, wherein acquiring the signal intensity of the wearable device includes:
    acquiring a broadcast signal broadcasted by the wearable device, obtaining a broadcast signal intensity of the broadcast signal, and determining the obtained broadcast signal intensity as the signal intensity of the wearable device; or,
    acquiring at least two broadcast signals broadcasted by the wearable device, calculating an average value of broadcast signal intensities of the at least two broadcast signals, and determining the obtained average value as the signal intensity of the wearable device.

5. A voice prompting apparatus, comprising:
    one or more processors; and
    a memory storing instructions that, when executed by the one or more processors, cause the one or more processors to:
    detect whether an unread communication message is received by an electronic device;
    acquire, if the unread communication message is received, a signal intensity of a wearable device coupled with the electronic device; and
    perform voice prompt for the unread communication message according to a prompting manner corresponding to the signal intensity;
    wherein, in performing the voice prompt for the unread communication message, the instructions further cause the one or more processors to:
    forbid the voice prompt or perform the voice prompt in a prompting manner that shields privacy information if the signal intensity of the wearable device is lower than a first intensity threshold, the privacy information including at least sender information and contents of the unread communication message;
    perform the voice prompt in a prompting manner that prompts brief information if the signal intensity of the wearable device equals or is greater than the first intensity threshold but is lower than a second intensity threshold, the brief information including at least the sender information of the unread communication message; and
    perform the voice prompt in a prompting manner that prompts complete information if the signal intensity of the wearable device equals or is greater than the second intensity threshold.

6. The apparatus according to claim 5, wherein the instructions further cause the one or more processors to:
    detect, when the voice prompt is being performed, in real time whether the signal intensity of the wearable device is reduced to a level lower than the first intensity threshold; and
    interrupt, if the signal intensity of the wearable device is reduced to a level lower than the first intensity threshold, the voice prompt.

7. The apparatus according to claim 5, wherein the instructions cause the one or more processors to:
    detect whether the unread communication message is present in the electronic device;
    detect, if the unread communication message is present in the electronic device, in real time whether the signal intensity of the wearable device is at a level equal to or greater than the first intensity threshold; and
    perform, if the signal intensity of the wearable device is increased to a level greater than the first intensity threshold, the voice prompt according to the prompting manner corresponding to the signal intensity.

8. The apparatus according to claim 5, wherein the instructions further cause the one or more processors to:
    acquire a broadcast signal broadcasted by the wearable device, obtain a broadcast signal intensity of the broadcast signal, and determine the obtained broadcast signal intensity as the signal intensity of the wearable device; or,
    acquire at least two broadcast signals broadcasted by the wearable device, calculate an average value of broadcast signal intensities of the at least two broadcast signals, and determine the obtained average value as the signal intensity of the wearable device.

9. A non-transitory computer-readable storage medium having stored therein instructions that, when executed by one or more processors of an apparatus, cause the apparatus to:
    detect whether an unread communication message is received by an electronic device;

acquire, if the unread communication message is received, a signal intensity of a wearable device coupled with the electronic device; and perform voice prompt for the unread communication message according to a prompting manner corresponding to the signal intensity;

wherein, in performing the voice prompt for the unread communication message, the instructions further cause the apparatus to:

forbid the voice prompt or perform the voice prompt in a prompting manner that shields privacy information if the signal intensity of the wearable device is lower than a first intensity threshold, the privacy information including at least sender information and contents of the unread communication message;

perform the voice prompt in a prompting manner that prompts brief information if the signal intensity of the wearable device equals or is greater than the first intensity threshold but is lower than a second intensity threshold, the brief information including at least the sender information of the unread communication message; and perform the voice prompt in a prompting manner that prompts complete information if the signal intensity of the wearable device equals or is greater than the second intensity threshold.

* * * * *